INVENTOR.

DONALD F OTHMER

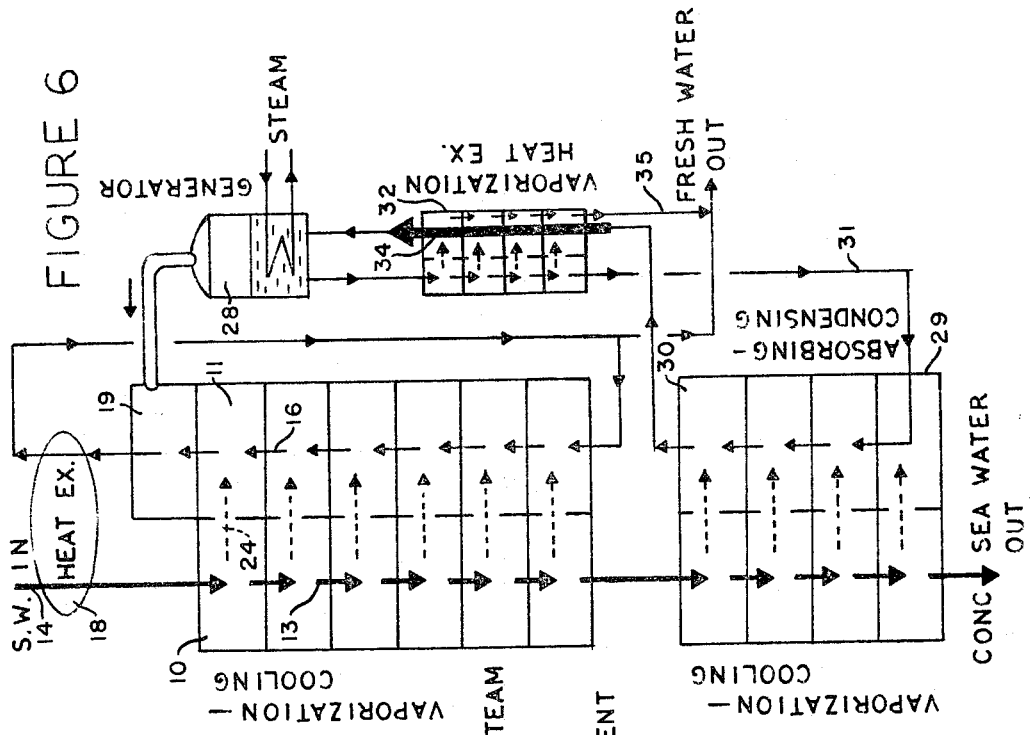
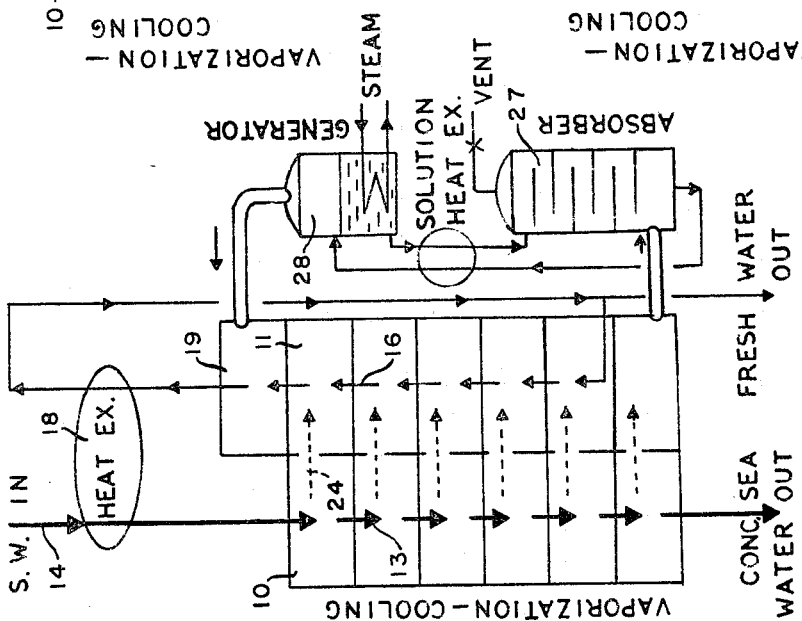

United States Patent Office 3,288,686
Patented Nov. 29, 1966

3,288,686
METHOD FOR MULTI-FLASH EVAPORATION TO OBTAIN FRESH WATER FROM AQUEOUS SOLUTION
Donald F. Othmer, 333 Jay St., Brooklyn, N.Y.
Filed July 12, 1963, Ser. No. 294,704
10 Claims. (Cl. 203—11)

This invention relates to a method of multiple flash evaporation of dilute aqueous solutions such as, particularly, sea water; concentrating the solution and condensing the vapors (a) to preheat the solution, itself, by indirect heat transfer as in the usual multi-flash evaporation process, or (b) to reheat a cycling stream of fresh water by direct contact heat transfer and condensation therein as in the so-called vapor reheat multi-flash evaporation process. The prime energy supplied at a temperature above that of the flashing stage of highest temperature may be from steam; or from the combustion of fuels with the gaseous products of combustion in either indirect heat transfer relation with the aqueous solution through a metallic surface, or by direct heat transfer through immediate contact with the aqueous solution. Alternately, the prime energy supply may be from vapors mechanically compressed from a lower stage of either of the types of multi-flash evaporation.

Accordingly, an object of the present invention is to provide a method of obtaining fresh water from water containing dissolved salts and the like, which method combines known processing steps in a unique and advantageous manner.

Another object is to increase the amount of condensation which takes place in a stage or in a half-stage, thus decreasing the size and capital cost of the evaporator.

Another object is to reduce the amount of prime heat to be supplied to the system, thus decreasing the thermal cost of the evaporation.

Another object is to utilize mechanical compression in a manner which allows the use of mechanical or electrical power when such is readily available rather than resorting to thermal energy to accomplish evaporation.

Another object is to utilize an absorption-generation or solution cycle as a means of bringing the vaporous heat from a lower stage of a vapor reheat system up to the higher pressure and temperature of the top stage.

A further object is to eliminate the formation of scale when solutions with scale-forming constituents are being concentrated—even at much higher temperature than heretofore thought possible.

Other and further objects of the invention will be obvious upon an understanding of the illustrative embodiment about to be described, or will be indicated in the appended claims. Various advantages not referred to herein will occur to one skilled in the art upon employment of the invention in practice.

Definitions

A "stage" may be defined as that space wherein liquid above the saturation temperature and pressure existing in the space is introduced to cause cooling and partial flash evaporation. The vapors from the evaporation are conveyed to another part of the space where they are condensed either by direct contact with a metallic heat transfer surface in the usual multi-flash evaporator, or by direct contact with the extended surfaces of fresh water cycling in an open stream in the Vapor Reheat system.

A "half stage" may be defined as half of the stage taken by itself, either the cooling-evaporating or brine side, or, in the vapor reheat evaporator, the heating-condensing or fresh water side. A half-stage is separated for purposes inherent to some particular step, usually at the top of the ladder. An evaporating half-stage is one on the brine side, and a condensing half-stage is the one on the fresh water side.

"Heat reject" may be defined as the elimination, usually to waste, of excess heat which may be supplied or available during the operation of a multi-flash ladder (of either the usual or the vapor reheat type) on the evaporation-cooling side, over the amount which can be absorbed in the condensing-heating side. This may often be due to an "upset" in operation, or due to a control of operating variables at less than their optimum conditions; but in some plants, it may represent a more or less continuous condition with accompanying reject and hence loss of heat to a group of several or more low-pressure stages cooled independently by a separate stream of cooling fluid which is discharged from the system with the heat which has been absorbed being wasted.

One type of heat exchanger which may effectively be used in these processes, particularly with the vapor reheat process, is the so-called liquid-liquid-liquid exchanger (LLLEX). Here: (a) the hot fresh water leaving the top stage is cooled by contacting it with a cooler oil which is insoluble in water, the oil being heated thereby; (b) the heated oil is then cooled by contacting it with another stream of raw inlet sea water which is heated thereby, thus accomplishing, overall, a heat interchange between the two aqueous liquids, without the necessity of metallic heat transfer surfaces between. The circulation of the oil acts as the heat carried, instead of a metallic tube. The oil is recycled without loss, and without loss or gain of water from either stream. The LLLEX is particularly adapted to use in the present processes and with the present improvements in evaporation techniques to be described because of the relatively low temperatures of approach which may be obtained with the streams on both sides with relatively inexpensive heat transfer equipment as compared to those with metallic surfaces. It also has a very low cost for a given duty of heat transferred and other advantages, such as freedom from scale and relative freedom from corrosion, which represent major problems of the usual heat exchanger with metal surfaces.

Another effective low-cost heat exchanger for use with the vapor reheat evaporation also will give close temperatures of approach of the liquid streams. This depends on a flash cooling of the hot fresh water. A doubly-distilled water is thus produced, which, in many cases, is an additional advantage. This, as well as the LLLEX, will allow temperatures of approach between the two streams as low as a fraction of 1° F. under conditions of normal design, as compared to the usual minimum of 5 to 15° F. for tubular heat exchangers.

The prime heater has previously been the unit wherein external heat is added to the preheated brine stream to bring it to the high temperature of the first flash evaporation. By adding the prime heat to the heated fresh water stream, thence by heat interchange to the brine stream, some major advantages are secured.

Compression of vapors formed in usual evaporations to a higher pressure and temperature allows them to heat by condensation on a tube, the liquid to be evaporated, which is passing therein. Major modifications of vapor compression as applied particularly to Vapor Reheat evaporators, are an important part of the present invention.

Similarly, vapors from a low stage of the vapor reheat ladder may be withdrawn and absorbed by an aqueous solution of hydrophilic material—with a high elevation of boiling point. Concentration of the solution by evaporation at a pressure sufficiently high gives vapors to be used as prime steam on either the brine or the fresh water side of the ladder.

As in most evaporations, heating is often done with steam; however, heat may be supplied by combustion or otherwise. The heating of the solution may be concentrated by a submerged combustion of a fluid fuel—usually gaseous, but sometimes liquid or possibly even a pulverant solid fuel. The present invention may also use submerged combustion of the type and with the features described, as a source of prime heat on the brine side of the ladder, as before, or in the stream of fresh water after it leaves the high temperature stage. The submerged combustion method has been found to recover the higher heating value of the fluid fuel. Thus, it adds to the stream of fresh water produced, the water formed from the hydrogen present in every commercial fuel; e.g., when natural gas is used, fresh water amounting to twice the weight of the natural gas which is burned is chemically produced and goes out in the product.

The so-called Heat Exchanger–2 allows lifting the whole vapor reheat ladder, or the normal multi-flash ladder, to a higher temperature level, with accompanying reduction of the ratio of pressures into the thermocompressor and out of the thermocompressor, as described hereinafter, for a given overall range of temperatures of the latter stages.

The drawings

FIGURE 5 is a schematic view of a vapor reheat multi-flash evaporator with an absorption-regeneration serving to compress the vapors from a lower stage.

FIGURE 6 is a schematic view of a system similar to that shown in FIGURE 5, which includes a multiple stage absorption, also a multi-flash cooling of the concentrated solution of adsorbate while preheating the dilute solution of the adsorbate on the way to the regenerator.

Figure 1:
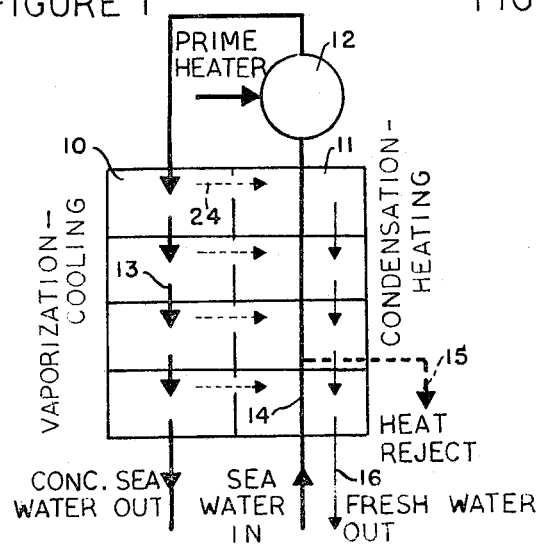
FIGURE 1 is a schematic view of the multi-stage flash evaporator system of the usual type, with heat rejected at the lower end of the ladder or stages, as is usual.

*Usual multi-flash evaporator.*—The ladder of stages in FIGURE 1 indicates the usual multi-flash system. On the left side of each there is a vaporization-cooling sequence of stages 10, and on the right side a condensation-heating sequence of stages 11.

The descending stream of brine on the left has first been heated while under pressure at least as high as the saturation pressure for the maximum temperature encountered in the prime heater 12, using heat supplied from an outside source, in FIGURE 1, from steam. The brine flashes to a successively lower pressure and temperature in each of many successive chambers or stages 10. The path of descending brine is indicated by the arrows 13 breaking at each stage, since there is no continuous enclosed conduit to the concentrated brine leaving at the bottom left. Vaporization occurs; and vapors pass from each of these flashing chambers 10 of each respective stage, across the stage to an interconnected condensation part 11 of the stage, where they condense on heat transfer tubes 14 through which is passing the sea water to be heated countercurrently by stages. The hot water leaving the condenser-heater side of the top stage then has additional outside heat added to the prime heater 12 to bring it up to the proper high temperature for inlet to the top stage.

If the balance between the flash evaporation and the heat which can be absorbed by the incoming sea water is not exact, more inlet sea water is cycled in the lower stages; and this is discharged as indicated by the heavy dashed line 15 labelled Heat Reject from a lower stage without being heated to the flashing temperature.

The condensate of fresh water formed on the tubular surfaces is removed in a stream of product shown by the arrows 16 on the far right.

Figure 2:
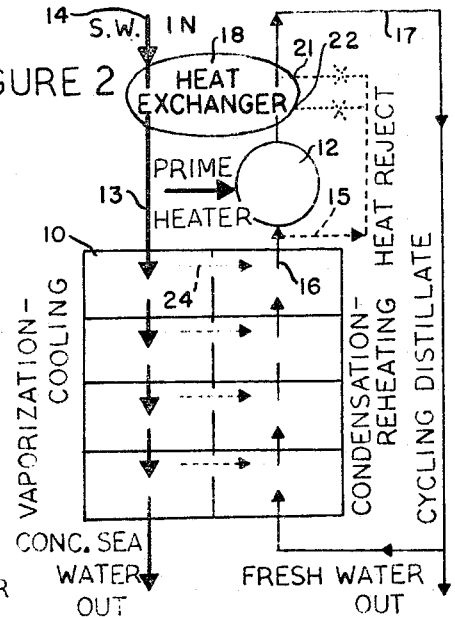
FIGURE 2 is a schematic view of a similar system utilizing vapor reheat, wherein the prime heater is heated with indirect steam and is on the fresh water side rather than, as usual, on the brine side; also heat is rejected at the upper end of the ladder of stages rather than at the lower end, as is usual.

*Vapor reheat evaporator with prime heat to fresh water stream.*—In the vapor reheat evaporator diagrammed in FIGURE 2, the left side of the ladder operates identically with that of FIGURE 1. Heated liquid is flash vaporized in multiple stages 10. The resulting steam passes from left to right in each stage to the condensing zone 11 at the pressure of the respective stages. A stream of fresh water 17 which has been chilled nearly to the low temperature of the system, i.e., the temperature of the inlet sea water, is recycled countercurrently to the stream of sea water; and it is thus reheated by the vapors to successively higher temperatures. It is augmented by the condensate or distillate in each stage and finally passes out of the top stage, at a temperature which is as close as possible to that of the heated sea water entering the top stage. The incremental amount of this fresh water for each cycle is later withdrawn as product water. The rising stream of recycling condensate on the right is indicated by the line of arrows 16, since there is no continuous conduit as in the preheating of the sea water in the usual multi-flash system. The method of causing flow to the fresh water or condensate from each lower pressure stage to the next higher pressure one is not indicated on this diagram.

The fresh water or condensate stream, heated and augmented in each stage, passes out of the top of the ladder and then through a prime heater 12 supplied in this case with closed steam. The heated stream then is passed through a heat exchanger 18. The raw sea water, or other dilute feed, is passed in countercurrent thereto and is heated to the high temperature for entry into the top flashing stage. The prime heat is thus transferred twice—first to the fresh water, then to the raw sea water feed.

The advantage of the flow sheet of FIGURE 2 in supplying the prime heat to the fresh water rather than to the seawater is that there is no possibility of scaling the heater in heating fresh water as there is in heating sea water due to the character of the dissolved salts present which, on heating, may precipitate a hard tenacious scale on the heat transfer surface.

Usually the prime heater of FIGURE 2 will be a tubular heater with steam condensing on the outside of tubes (and condensate recovered as fresh water which would usually be returned directly to the stream generator). However, other forms of prime heaters may be used. Thus, combustion of fuels would give contact of the hot products of combustion and hence heat transfer to the metallic surfaces. Submerged combustion, as above mentioned, gives direct heat transfer. Very efficient utilization of heat is possible, the higher heating value of the fluid fuel may be achieved—with the water formed by the combustion available as product. Fuels are desirable which are low in sulfur or other materials which give products, e.g., sulfur dioxide, to contaminate the product water.

Figure 3:
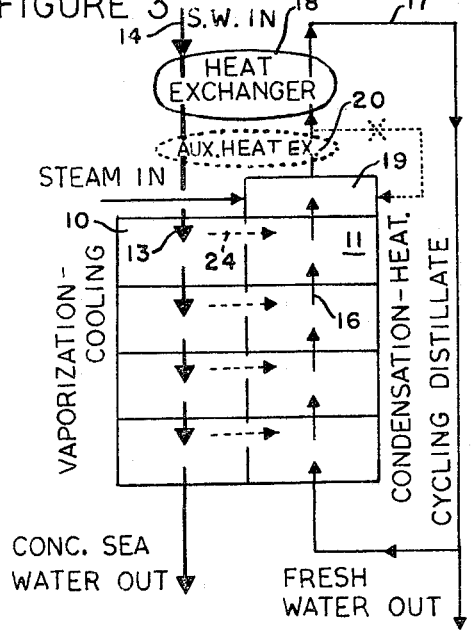
FIGURE 3 is a schematic view of a system similar to that shown in FIGURE 2, wherein a half-stage is superimposed on the fresh water side of the vapor reheat ladder, heated with direct steam; also there is an auxiliary heat exchanger.

*Vapor reheat evaporator with thermal half-stage.*—FIGURE 3 indicates a half-stage 19 superimposed on the cooling-condensation or fresh water side 11 of the Vapor Reheat ladder, with live steam being supplied thereto as the source of prime heat. The heating effect is the same as in FIGURE 2; and in this case, all metallic heat transfer surfaces are entirely eliminated. Thus there will result a very low—or negligible—temperature drop from steam to hot water leaving the half-stage acting as prime heater, as compared to FIGURE 2; and a higher temperature can be achieved in the ladder for any given temperature of steam available because there is practically no temperature drop between the boiler steam and the fresh water leaving the half-stage and going to the heat exchanger 18. This will result in a greater production of fresh water per pound of steam supplied, as much as 5 to 10%.

Of even more importance may be the elimination of the possibility of the formation of scale in heating sea water to these high temperatures in the usual prime heater. If an LLLEX is used for preheating the raw sea water, there is no possibility of scaling problems in the system as a whole; and the highest temperature available from the steam may be used with attendant advantages.

In FIGURE 3, the connections labelled Heat Reject are not shown as in FIGURE 2, for by-passing fresh water around the half-stage 19 which acts as the prime heater 12. These prevent the loss of heat otherwise rejected, as explained below; and the operation as to heat reject in FIGURE 3 could be identical with that of FIGURE 2.

*Vapor reheat with prime heater and auxiliary heat exchanger on water side.*—Under many desirable conditions, the condensate stream leaving the top of the ladder may be less in amount—or require less sensible heat to change it one degree of temperature—than the sea water stream entering the top of the ladder. Thus, to absorb heat in the prime heater on the fresh water side which will then be passed via the heat exchanger to the entering sea water, the fresh water would have to be heated through a greater temperature range than would be given in heating the sea water. This may be undesirable because of a limit to the highest temperature which might be available from a given source of prime heat, e.g., a fixed steam pressure. Or there may be an increased energy cost in increasing the temperature, and hence pressure (e.g., using vapor compression described below). Usually, it is desirable to heat the incoming sea water side to as high a temperature as possible, with a given source of prime heat. This may be done without increasing the temperature if a larger amount of heat can be put into the fresh water stream by cycling a larger amount of fresh water through the prime heater.

Then, some of the fresh water from the prime heater, after it has passed part of its heat to the incoming sea water, may be recycled back to the prime heater. Thus, by having a larger amount of fresh water heated through a lower temperature range in the prime heater to a lower top temperature, the desired amount of heat may be added first to the fresh water in the prime heater, then to the sea water. Either a side stream of fresh water may be withdrawn from an intermediate point of the heat exchanger 18, after partial cooling, or an auxiliary heat exchanger 20 may be used in series, with a division of the fresh water stream, after passing this auxiliary unit, directly back to the prime heater.

The use of such an auxiliary heat exchanger with the prime heater on the water side is shown in FIGURE 3, as Aux. Heat Ex. Here it is applied to the use of open steam in a half-stage; but it may also be applied to a prime heater as in FIGURE 2, using closed steam or other method of heating. The water stream cycles through the prime heater and is cooled by the auxiliary heat exchanger (LLLEX or other) in passing its heat to the inlet sea water. The stream is then divided; and a part passed back through the prime heater to absorb the same amount of heat in a larger volume of water as otherwise would be given by the prime heater in heating a smaller volume to a higher temperature.

*Recovery of heat otherwise rejected.*—The operation of the usual flash evaporation ladder may result in an unbalance of the vapor supply from the evaporation-cooling side to the condensation-heating side. Thus more vapors may be formed than can be condensed in heating the cold stream. Usually the corresponding heat is rejected to waste, by cycling another stream of additional cooling liquid in the several lowest stages and discarding this liquid with the heat it has adsorbed. Another form of Heat Reject which saves most of that otherwise wasted is through the diverting of a part of the pre-heated sea water stream, leaving the top stage, having it bypass the prime heater and fed into that stage of the ladder on the brine side where the temperature is just lower than its own. No figure shows this method of heat economy in the present description.

Similarly the vapor reuse system may reject heat during upsets—or for long periods of time if the optimum conditions cannot be achieved for some particular reason.

In FIGURE 2 is shown a dashed heavy line 15 branching off from the fresh water stream passing to the prime heater 12. A small fraction of this stream may be diverted (automatically, if desired) to pass to a point in the heat exchanger 18 where the temperature is nearly the same. Two different valved inlets 21 and 22 are shown to indicate that there is a selection of points, possibly several, to secure the inlet to the heat exchanger of the stream of fresh water at the point where the temperature is almost the same as that of the stream. Thus, there is diverted a part of the fresh water stream which has absorbed heat from the flash evaporation to that point in the heat exchanger where its heat may be used to greater advantage. Diverting a greater or lesser amount of the stream to its appropriate temperature point in the heat exchanger will allow complete control or balance of the two sides of the ladder without the loss or rejection of any substantial amount of heat. While the amount of heat rejected in either the usual multi-flash evaporator or the Vapor Reheat evaporator may show an average loss of from 10 to 20% of the total supplied to the prime heater, the actual loss by using the above system may average 2 or 3%, since most of it is directly recoverable.

An alternate but less readily operated and controlled method of permitting the same balancing of the vapor flows and heat flows from the evaporation to the condensation side, has been found to be accomplished by withdrawing a stream of the sea water being heated from that point in the heat exchanger where its temperature is just below the temperature of the hot fresh water leaving the top stage. This stream of sea water withdrawn (automatically, if desired, in amount to allow the system to come to a balance of evaporation and condensation of vapors), is bypassed around the top stage or stages to enter the evaporation side of the ladder at its own temperature. No diagram of this is shown in the figures. The total heat loss due to heat reject may again average 2 or 3% through the use of this bypassing arrangement, compared to the 10 to 20% heat loss in flash evaporators normally due to the usual heat reject.

*Process details.*—A part of the concentrated brine discharge may be recycled to the raw sea water inlet, to save heat, or for some other reasons such as to increase the concentration of the blow down, to minimize use of sea water, to minimize use of any treating materials added to the sea water, etc.

In FIGURES 1 and 2, and in other figures, the flow of aqueous solution (which is sometimes referred to as "sea water" and sometimes as "brine") is shown by a heavy line 13 while light lines 16 represent the flow of fresh water—always in the present case, condensate. The flows of vapors from the vaporization-cooling compartments 10 of the stages across the respective stages to the condensation-heating compartments 11 are shown by dashed horizontal lines 24.

In both FIGURES 1 and 2, the streams passing upwardly in the condensing-heating side must always be forced or pumped against the increasingly higher vapor pressures of the upper stages. In FIGURE 1, the solution is being heated; thus its vapor pressure is being continually increased, and the pumping action must always counteract that increase in vapor pressure (in addition to hydrostatic head and pipe friction). In effect, this pumping action must counteract the higher pressure on each successively higher stage; and the total pressure on the pump is the pressure of the top stage, plus the hydrostatic pressure, plus the pipe friction.

The flow sheets of the several figures indicate diagrammatically and for simplicity of presentation the compartment wherein flash vaporization occurs always at the same elevation as, and immediately adjacent to, the condensing compartment of the respective stage. Also, the higher pressure stage is always shown at the top of the series, with successively lower pressures in the stages down to the bottom or low pressure stage. The overall pressure range is governed by the vapor pressures of water at the temperatures considered, which may be from the highest temperatures and pressures practical from a consideration of the design and materials of construction of the stages, down to an approach to the ambient temperature, or that of the sea water available. This later temperature may usually, but not necessarily, correspond to a pressure much below atmospheric in the bottom stage of the ladder. Any desired range of temperature may be used; in practice, the top stage should desirably be at a temperature at least 75° to 150° F. above the temperature of the bottom stage. However, as noted elsewhere, where narrower ranges of temperatures are economically available between the high and the low sides of the ladder, they may often be used, down to 25° F. or even less.

This might be the difference of temperature between the brine in at the top stage, and water in at the bottom stage.

The particular novelty of the flow sheet of FIGURE 2, as compared to any previous arrangement of a Vapor Reheat system is that the prime heater is on the water side, rather than on the brine side; and the fresh water is heated to the highest temperature of the system before it goes through the heat exchanger, rather than heating the brine to the highest temperature after it comes from the heat exchanger. This places more duty on the heat exchanger, which now must transfer all of the heat as before, plus that of the prime heat which has been added to the fresh water stream.

The particular advantage of this system, largely made possible by utilization of the novel and efficient heat exchangers for liquids now available is that the prime heater (indicated here diagrammatically as a heater with metallic surfaces) is heating fresh, i.e., distilled water, rather than sea water. Thus, there can be no scaling of the tubes, as might be the case when heating sea water to the high operating temperature.

The auxiliary heat exchanger 20 is used to add prime heat to the water side. This has been found desirable under many conditions, usually and specifically, if the overall temperature range of the ladder of stages is more than about 100° F., and if the number of stages is more than 10 or 15. In those cases, the optimum operating conditions require a smaller amount of fresh water to enter the bottom stage to be cycled up through the stages, than the amount of sea water which enters the top stage to undergo multi-flash evaporation. However, the amount of heat on the two sides of the ladder must be the same; and if the amount of fresh water recycle is less than that of the sea water feed, the fresh water will have to be heated in the prime heater through a greater temperature range to maintain the heat balance. By having a separate recycle of a greater volume of fresh water from the prime heater (or condensing half-stage) through the auxiliary heat exchanger, this higher temperature is not necessary, since a larger volume of fresh water will absorb the greater amount of heat necessary to heat the inlet sea water to the desired temperature for it to enter the top flasher. The higher temperature would be undesirable in some cases, where it would limit the maximum temperature which could be used in the top stage of the flash evaporation ladder.

In FIGURE 3, the auxiliary heat exchanger 20 receives all of the preheated fresh water discharged from the condensing half-stage 19. This stream is cooled, (i.e., about the same number of dergees as the stream of sea water is cooled in the first flash stage of the ladder). Heat is used in preheating the sea water. A small part of the heated fresh water (varying from 0% to about 35 or 40% as a maximum), is diverted directly back to the condensing half-stage in FIGURE 3.

*Vapor compression flash evaporation flow sheets*

Figure 4:
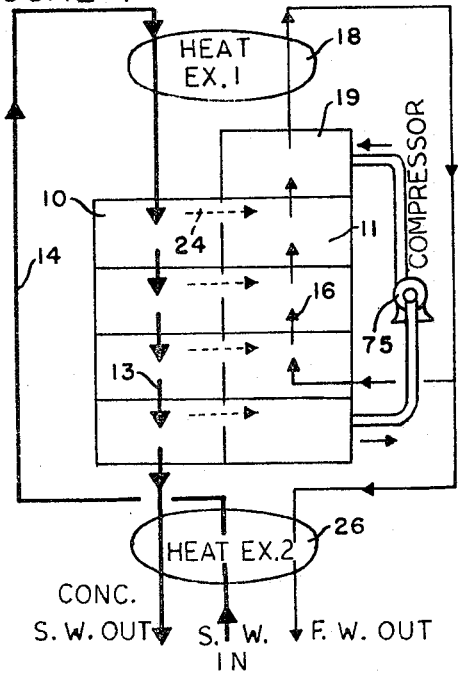
FIGURE 4 is a schematic view of a vapor reheat multi-flash evaporator with a vapor compression system operating between the top half-stage and a lower stage—also a second heat exchanger for preheating a salt water feed.

In FIGURE 4, vapors from the lowest pressure stage 11 of the ladder are compressed at 25 to a sufficiently high pressure and temperature to allow their condensation and thus supply their heat in the prime heater. The recycling stream of fresh water then enters the stage next above that from which the vapors were withdrawn. While the range of compression, in some cases, may be only 5 stages, it has been found that a minimum of 8 stages is usually more economical, and a higher number, 20 to 30, is preferable. In FIGURE 4, a half-stage 19 on the condensing side is indicated, the same as in FIGURE 3; but, in some cases, the compressed vapors may pass to a tubular prime heater on the fresh water side, as in FIGURE 2, or to a tubular prime heater on the brine side, not shown in the figures.

Vapor compression may also be used across the top 5 or preferably 8 or more stages of the usual multi-flash evaporator. The pressure of vapors from the lowest stage is raised to give a saturation temperature high enough to cause heat transfer on the tubes of the prime heater. Cold sea water enters the stage just above that at which vapors are withdrawn and passes through the tubular condenser-heater tubes in the usual manner. No figure is shown for this arrangement.

The compression for either the Vapor Reheat or the usual multi-flash evaporator requires less energy if a second heat exchanger 26 is used. This brings the temperature of the vapors in the lowest stage of the evaporator much above the temperature of sea water. In FIGURES 1 and 2, the temperature of the vapors is not much above the temperature of raw sea water, and the pressure is very low, while the specific volume is very high. It is expensive to compress vapors of such a low pressure and high specific volume to a sufficiently high pressure and temperature to be used in the prime heater. Hence, the whole flash evaporation is moved to a higher range on the vapor-pressure curve of water.

Compressing steam gives superheat. This is not helpful in the necessary heat transfer, which must be from and at the saturation temperature corresponding to the highest pressure. In the vapor reheat system, contact with the cooler water surface is an effective desuperheater.

While the usual multi-flash evaporator may be used at these higher temperatures which may be reached with the efficient heat exchangers cited (or less well with ordinary units) there is also the question of scale formation in the tubes of the condensing-heating side of the ladder. No such scaling takes place in the vapor reheat evaporator which thus has been found to be particularly adapted to take advantage of vapor compression as diagrammed in FIGURE 4 because of the very close approach to thermal equilibrium of the vaporizing and condensing streams, and thus the low temperature difference required for each stage.

While it is also possible to operate the thermocompressor across the pressure range of a multi-stage ladder, particularly if a feed at a temperature elevated compared to that of the ambient is available, the preheating of this feed up to a high enough temperature and corresponding saturation pressure so that the compression range across the ladder is not more than 2 to 3, and preferably in the range 1.3 to 1.8 or 2.0, will be more economic since the heat exchange operation is so cheap and efficient with the preferred units. (As previously indicated, the chosen temperature range is one of selection of a range on the vapor pressure curve of the water, where the absolute pressure ratio at the high and low points is within the desired range; and the corresponding decrease in temperature of the stream of sea water in cooling gives the desired amount of flash evaporation.)

The balance of the optimum temperatures for operating the flash evaporator thus can be made with the known design factors of the vapor compressor to be used, the flash evaporator, and the heat exchangers. The question of scaling would also have to be considered in designing the usual multi-flash system.

Vapor compression, as described above, for both the usual multi-flash and the vapor reheat types, gives major advantages particularly in those cases where mechanical energy is relatively cheap or available compared to thermal energy. Also, if a boiler plant has to be installed particularly to produce fresh water, the power may be generated by steam turbines to give vapor compression, as in FIGURE 4, while the exhaust steam from the turbines is used for another vapor reheat unit, e.g., as in FIGURE 3.

As an example of the application of vapor compression to the vapor reheat evaporator, as in FIGURE 4, there may be considered a system to produce one million gallons of fresh water with less than 100 p.p.m. of total solids by its evaporation from sea water available at 75° F. and containing 3500 p.p.m. of total solids. Because of the elimination of problems connected with scale by the use of this system without metallic heat transfer surfaces, and the desire to utilize fully the advantages of the elevated temperature (compared to the sea water temperature) at which the evaporation will be conducted, a concentration of 3 to 1 in the evaporator may be used instead of the usual 2 to 1. In either case, a recycle of brine, as well as fresh water, will be most advantageous around their respective sides of the ladder.

The LLLEX 18 is used for preheating the feed sea water and simultaneously cooling the hot fresh water stream leaving the half-stage at 232° down to 213° F. Another LLLEX 26 is used to cool both the 1,000,000 g.p.d. of fresh water condensate from 213° F. to 78° F. and the 500,000 g.p.d. of brine discharge, while simultaneously preheating the 1,500,000 g.p.d. of sea water feed from 75° F. to 211° F. Alternately, a flash cooling system, A, may be used.

The suction side of the compressor 25 draws vapors from the lowest of 15 stages where the temperature of the vapor is approximately 214° F. and the pressure is 15.12 pounds per square inch absolute. The compression ratio is 1.43 to give a discharge pressure of 21.65 pounds per square inch absolute at approximately 232° F. There are 15 stages and the temperature of the recycling condensate stream is increased an average of 1° F. in each. (Careful determinations have established that, in the absence of heat losses and other inefficiencies or irregularities, the temperature increment in each stage should be the same, when the system is in balance and there is maintained the optimum ratio of brine to water circulation.) Because of the elevation of boiling point of the brine, also because of heat losses, also because of the slight heat of solution of the salt, the temperature rise in the top half-stage which acts as the prime heater will be larger than for a stage and, in this case, is approximately 3° F.

The power supplied by the compressor motor, including drive inefficiencies, is approximately 790 k.w. (1060 h.p.). The pump motors for the vapor reheat evaporator, for the two heat exchangers, for recycle, feed and discharge streams, draw a total of approximately 160 k.w. (215 horsepower); the total power load is thus about 950 k.w. (1275 h.p.), or 22,800 k.w.h. per day for 1,000,000 gallons of fresh water production, or 22.8 k.w.h. per 1000 gallons of fresh water.

It has been found that higher inlet and outlet temperatures to the vapor reheat evaporator with the same ratio of compression 25 across the compressor will give a markedly lower power consumption. Higher temperatures and pressures give some disadvantages, including heavier vessel requirements, greater corrosion, and greater heat losses. However, such higher temperatures and pressures will, in many cases, give greater thermal efficiencies and lower thermal costs. The optimum values have to be determined for each particular set of conditions. Similarly, it will, in every case, be necessary to determine how far down in the pressure scale, i.e., the lowest temperature of the stage, at which the suction to the compressor should be taken, and thus also the operating ranges of the heat exchangers.

The control of the system to balance the two sides of the ladder-vaporization-cooling and condensation-heating without substantial heat reject, may be accomplished as above noted by withdrawing a stream of fresh water from the top stage (below the half-stage and feeding to a point in the upper heat exchanger at the same temperature).

Also, as noted above, the heat exchanger 2 may be in a single unit or in two parallel units: The one cooling the concentrated sea water discharge, for example, might be a flash cooling system which would give an additional 65,000 gallons of fresh water at no additional operating cost. This would increase capacity by 6.5% and reduce power consumption the same amount. (If used to cool the product water, double-distilled water would be produced.) The low resulting power cost of 21.5 k.w.h. per 1000 gallons compares with the 56 k.w.h. required by a two effect standard vapor compression evaporator using forced circulation, operating over the same range of 214° to 232° F.

*Absorption-regeneration flash evaporation flow sheets*

A process somewhat analogous to the vapor recompression process has now been developed which gives some of the same advantages of the combination of vapor compression with the Vapor Reheat flash evaporation. It does not require a compressor. In those cases where thermal energy is available, relatively more cheaply than mechanical energy, this may be an advantage. It adds to the equipment cost as compared to that for the vapor reheat system taken by itself, but usually has a thermal advantage.

In this system as shown in FIGURE 5, the normal Vapor Reheat operation is conducted in the upper part of the ladder, either above all but the last stage, or in a first series of stages of vaporization-condensation in the usual manner which are above a second series of lower pressure stages which operate separately as will be described.

Thus, the vapor reheat operation may be used with open steam in the prime heater located on the water side, and fresh water recycling back to and entering the next to the lowest stage. The vapors from the last stage of the regular ladder are passed off and absorbed at 27 in a solution of a hydrophilic material, such as glycerine or other glycols (representative of organic liquids), lithium chloride, lithium bromide, caustic soda, caustic potash, etc. Phosphoric and/or sulfuric acid, both inorganic liquids, could be used—but they would usually cause too much corrosion.

After such absorption or condensation of the vapors as water of solution, the solution, now more dilute, of the hydrophilic material, is then concentrated or regenerated in an evaporator, often called a generator 28. This operates at a much higher pressure and temperature to supply vapor suitable for use as prime steam. The regenerated and concentrated hydrophilic solution is recycled back to the absorber 27 for reuse.

The vapor pressure of water at any given temperature out of solutions of any substantial concentration of these hydrophilic materials, is quite low compared to the vapor pressure of pure water at the same temperature. Hence, when such hydrophilic solutions are contacted with water vapors, even at a relatively low pressure, the vapors will be absorbed or condensed therein. The equilibrium of condensation is one primarily due to saturation vapor pressures. Thus, saturated vapors may actually condense into a liquid solution of higher temperature if the partial pressure of water out of the solution is lower.

For example, a 50% solution of caustic soda has a vapor pressure of about 10 millimeters of mercury, at a temperature of 130° F., where pure water has a vapor pressure almost 12 times as much. Thus, vapor in equilibrium with or flash evaporated from water at any temperature down to 53° F., where it has a pressure of 10 mm., would condense in a 50% caustic soda solution at 130° F.

It is thus evident that the solution of caustic soda or other hydrophilic agent or material may be used as a means of condensation or absorption of the water vapors given off in a series of stages of multiple flash evaporations. The Condensation-Heating side (usually known as the fresh water side) of a system analogous to vapor reheat, would be supplied with such a solution instead of fresh water; and this side could operate at much higher temperatures as long as the saturation pressures of the water were always lower in the corresponding stages of the vaporizing-cooling side of the ladder.

By withdrawing from the top stage the caustic soda or other hydrophilic solution and evaporating the water therefrom at, say, atmospheric pressure, the vapors would be regenerated to be used as prime steam. The 50% caustic solution would have to be heated, however, to a temperature of about 290° F. to accomplish such boiling to give vapors at atmospheric pressure. In recycling such a solution, of course, it will be operating at different concentrations of a solution cycle because it would become diluted during the absorption and then be concentrated during the regeneration.

*One-stage or simple absorption.*—The diagram of FIGURE 5 represents a flow sheet for a vapor reheat evaporation, utilizing a simple, one-stage absorption system for the water vapor from the lowest stage.

It is obvious that the other methods of operation already described: for saving of the heat otherwise rejected, for the use of prime heater on either the water side or the brine side, for the use of a half-stage for direct condensation of prime steam, may also be incorporated here, in conjunction with the preferred methods of heat exchanging, etc. They are not, necessarily, included in the figure or the following description.

In the operation of the system of FIGURE 5, the concentration range may be chosen based on the temperature range desired or available for the vapor reheat ladder. As an example, a caustic soda solution of 50% strength might leave the regenerator and pass to the top of the absorber, while a solution of 30% strength caustic soda might be the hydrophilic or absorbent liquid at the bottom of the absorber tower after absorbing the vapors and then being recycled back to the generator.

With such a regenerating action, and over the range of temperatures of the vapor reheat ladder of 210° to 85° F., the steam consumption in the regenerator is about 12.5 pounds product water per pound steam when 40 stages are used. This is lower by about 20–25% than if prime atmospheric steam amounting to about 10 pounds product water per pound steam, was added directly to the half stage 19 for open condensation.

This advantage of reduced steam consumption is very worthwhile in large installations, but it does require an appreciable additional amount of equipment as compared to the Vapor Reheat system alone. This additional amount of equipment in a large system might amount to 25 to 30% of the overall cost, particularly if nickel equipment for resistance to the corrosion caused by strong caustic soda is used in the generator. Furthermore, the high elevation of boiling point of the 50% caustic soda solution, which is almost 80° F., reduces very considerably the effective overall operating temperature range of the vapor reheat ladder. This may not always be important.

*Multiple stage absorption.*—In FIGURE 6 is shown another modification of the same use of absorption in conjunction with the vapor reheat ladder of stages. In this case, the upper ladder of stages is as described before with a half-stage 19 for direct condensation of prime steam. Other features of the vapor reheat process heretofore described may be used in conjunction with much of this system.

An arrangement 29 which corresponds to a second series or ladder of stages 30 for flash evaporation-condensation, at successively lower pressures, is also used. The brine from the lowest stage of the upper ladder is allowed to flash consecutively in the second series of stages on the evaporating-cooling side at the lower pressures there. An absorbent liquid—i.e., a solution of hydrophilic material, circulates through 31 on the right side for absorption or condensation of vapors, countercurrently, in the same manner as does the fresh water stream in the usual vapor reheat system of evaporation-condensation.

In this case, again, this absorbent liquid may be an aqueous solution of any one of the several hydrophilic agents which are cheap, relatively non-corrosive to the materials of construction used, and have a satisfactory lowering of vapor pressure. (Stated in another way, the hydrophilic solution also has a relatively high elevation of boiling point.)

The more concentrated solution of hydrophilic agent is fed into the bottom stage of the lower ladder, up through the successively higher pressure stages on the absorbing-condensing side. In this case, there is the normal heating of the liquid due to the heat of condensation and also due, in this case, to the heat of dilution of the hydrophilic agent; for example, caustic soda in the added water of the vapors. The most dilute solution of the hydrophilic agent, at the highest temperature, discharges from the top of this ladder, charged with the vapors absorbed from the flash evaporation.

The dilute solution may then be passed through a heat exchanger 32 of the flash evaporation type. (Alternately, a tubular heat exchanger or an LLLEX may be used, with somewhat less advantage.) In the flash evaporation type, there is a closed condensation, i.e., the dilute solution of hydrophilic agent is passed through tubes 34 on which vapors are condensing as they come from the flash cooling of the hot solution of hydrophilic material leaving the generator. This condensate is removed at 35 to add appreciably to the product fresh water.

In the generator 28, the solution is concentrated as before, to give vapors which are used as prime heat, at a much higher pressure than in the top of the lower ladder of stages, used as absorber-condenser. The concentrated solution is further concentrated by the flash evaporations in the succession of stages of the vaporization heat exchanger, to give vapors which condense on the tubes carrying the dilute absorbing liquid. Finally, the cooled and more concentrated absorbing liquid is passed from this vaporization heat exchanger and into the lowest one of a second series of stages, which are below the Absorbing-Condensing ladder. In this particular case, and under the range of temperatures and absorbent concentrations above indicated for FIGURE 5, the utilization of steam in the generator is lower. About 14.5 pounds of product water is produced per pound steam in the flow sheet of FIGURE 6.

Here again, there would have to be considered the additional disadvantage of using the hydrophilic agent. In the case of magnesium bromide, or magnesium chloride, or caustic soda, or caustic potash, all require consideration as to special materials of construction in the range of temperatures and concentrations involved. Solutions of organic hydrophilic agents, such as glycerine or the glycols, do not increase the rate of corrosion of equipment, as compared to aqueous solutions of electrolytes to anything like the same degree. However, they have certain other disadvantages. The balance must always be made against the savings in heat and the increased cost of plant.

Another feature which must be considered is the fact that the temperature of steam, if steam is used in the generator, must be at a comparatively high temperature and pressure to that which would be supplied to the half-stage 19 of the fresh water side of the main reheat ladder. This is because, first, of the necessary temperature drop for the heat transfer required and the corresponding loss of available temperature there; but principally because of the high elevation of boiling point of the concentrated hydrophilic solution. This produces superheated steam, all of the heat of which is immediately available in its direct condensation; but the high temperature is not usable since it condenses at the saturation temperature.

If submerged combustion or direct-firing is used for heating the generator, this loss of available temperature may not be important in availability of the heat to be supplied.

There are cases where advantage may be taken of this combination of vapor absorption-generation with the vapor reheat ladder; but there should also be noted that an increase of the efficiency of the vapor reheat ladder itself, with an increased number of stages, may often be obtained by utilizing the higher temperature required in the generator to overcome the elevation of boiling point directly in the top stage of the usual ladder.

While the present invention has been primarily described in connection with obtaining fresh water from sea water, it will be appreciated that the process can be utilized for other purposes.

Although the terms sea water or brine may often be used to indicate the solution being concentrated, other dilute solutions—usually, but not necessarily, aqueous—may also be processed in the same way; and the advantages of the invention may thus be secured. In the case of non-aqueous solutions, the condensate from the vapors, e.g., the recycling stream of condensate in the vapor reheat process would not be fresh water as referred to herein, but would be the solvent of the dilute solution in question, free of nonvolatile materials.

Solutions of inorganic, or of organic materials, or of both, may be concentrated by the methods to be described; and in handling these solutions somewhat different conditions may pertain even though the processing and equipment are much the same. Thus, a solution of sulfite waste liquor which may be concentrated by this method would have different characteristics and a much higher elevation of boiling point than is encountered in the desalination of sea water. Even with solutions of common or other salt, when a concentrated brine is desired to make the salt itself as the product, rather than to make fresh water, the elevation of boiling point of the recycling liquor is important.

I claim:

1. The system of flash evaporation of an original aqueous solution to produce fresh water, substantially free of solute, which comprises the following steps:
  (a) heating the said original aqueous solution to the highest temperature it encounters in the system, in a countercurrent liquid heat exchanger with a stream of fresh water which is at a higher temperature during this step and is being cooled thereby, the said original solution being at a temperature below the boiling point of the solution at the pressure;
  (b) passing the said original solution directly after said heating into plural stages at successively lower pressures and temperatures, reduced from that at the discharge of said liquid heat exchanger, to vaporize a part of the water in the solution and to obtain fresh water vapor in the respective plural stages;
  (c) directing the said water vapor formed in the respective stages to respective condensing zones of said stages;
  (d) passing fresh water at a relatively lower temperature through the respective condensing zones in counterflow relationship to the flow of solution passing through the stages, the said fresh water being maintained at temperatures below its boiling points at the pressures prevailing in the respective condensing zones;
  (e) directly contacting the water vapor with the fresh water to condense the vapor and to form a combined stream of fresh water;
  (f) removing the combined stream of fresh water from the last condensing zone, which is at the highest temperature, and passing the combined stream through a prime heater where heat is supplied from an external source at the highest temperature in the system of flash evaporation, the said external heat being the only external heat supplied to the system;
  (g) passing the heated, combined stream of fresh water to the said countercurrent liquid heat exchanger; and
  (h) withdrawing from the system a portion of the combined stream of fresh water, which amount is approximately equal to the total amount of the vapors formed in the said vaporizations of all the stages.

2. The system of claim 1, wherein the combined stream of fresh water removed from the last condensing zone which is at the highest temperature is divided into a relatively larger portion and a relatively smaller portion, said larger portion being passed through the prime heater and thence to the said countercurrent liquid heat exchanger; and said smaller portion being diverted directly to said countercurrent liquid heat exchanger, where it joins again the said larger portion at a point where said larger portion has been reduced from the higher temperature of the prime heater to substantially the temperature of said combined stream of fresh water leaving the last condensing zone.

3. The system of claim 1 wherein the said countercurrent liquid heat exchanging operation comprises:
  (a) cooling the said combined stream of fresh water heated in the prime heater and removed therefrom by a second series of flash evaporations in a second series of plural stages at successively lower pressures and temperatures, reduced from that at the discharge of the prime heater;
  (b) vaporizing a part of the said fresh water and obtaining fresh water vapor in the respective plural stages of the second series;
  (c) directing the said water vapor formed in the respective stages of the second series to respective condensing zones of said stages of the second series, so that it may be condensed and caused to heat without direct contact the said cooler original aqueous solution which is being circulated in closed channels through said condensing zones; and
  (d) withdrawing the condensate so formed in the plural stages of the second series as twice-distilled water.

4. The system of claim 1, wherein the said countercurrent liquid heat exchanging operation comprises:
  (a) contacting directly by a countercurrent, liquid-liquid relation the said combined stream of fresh water heated in the prime heater and removed therefrom by an intermediate cooler stream of a liquid, substantially water-insoluble, which is being heated thereby; and
  (b) cooling said stream of substantially water-insoluble liquid, after being so heated, by a direct liquid-liquid contacting with the said original aqueous solution, thereby heating said original aqueous solution.

5. The system of claim 1, wherein the external heat supplied to the prime heater comes from steam supplied at a higher temperature than that of the combined stream of fresh water from the last condensing zone, said steam being in direct contact with the said combined stream of fresh water.

6. The system of claim 1, wherein the external heat supplied to the prime heater comes from the burning of a fluid fuel under the surface of said combined stream of fresh water from the last condensing zone, the combustion product gases from said burning being in direct contact with said combined stream of fresh water.

7. The system of claim 1, wherein the external heat supplied to the prime heater comes from the compression of fresh water vapor withdrawn from the stage of said plural stages which is at the lowest pressure and temperature;

said fresh water vapor being passed to a vapor compressor which supplies heat to the fresh water vapor to increase its pressure and temperature to a pressure and temperature higher than that of the combined stream of fresh water removed from the last condensing zone of highest temperature; and said water vapor, after compression, being passed to the prime heater where it supplies heat to the said combined streams of fresh water.

8. The system of claim 1, wherein the external heat supplied to the prime heater comes from water vapor supplied by a generator at a temperature higher than that of the combined stream of fresh water from the last condensing zone;

the amount of said water vapor being substantially equivalent to an amount of water vapor which is being withdrawn from the stage of lowest temperature and pressure of said plural stages;

which water vapor, withdrawn from the stage of lowest temperature and pressure is passed to an absorber where it is absorbed in a solution of a relatively concentrated solution of hydrophilic material in water, said absorption of water vapor producing thereby a relatively more dilute solution of the hydrophilic material;

which more dilute solution of hydrophilic material leaves the absorber and is passed, at a higher pressure, to the said generator, wherein fresh water vapor is evaporated for supply to the prime heater in said substantially equivalent amount as that withdrawn from the stage of lowest pressure and temperature, but at a higher temperature, pressure, and heat content;

while the said relatively dilute solution of hydrophilic material is concentrated in the generator substantially to its former relatively concentrated condition and is passed from the generator back to said absorber.

9. The system of claim 8, wherein the relatively dilute solution of hydrophilic material leaving the absorber and passing to the generator is passed in a countercurrent heat interchanging relation with the relatively concentrated solution of hydrophilic material which is leaving the regenerator and is passing to said absorber; whereby the relatively dilute solution is being heated and the relatively concentrated solution is being cooled.

10. The system of claim 8, wherein the said absorption of water comprises the following steps:

(a) passing the said original solution, after it has passed the said plural stages for flash evaporation and condensation of water vapor, into a second series of plural stages for flash evaporation and absorbing water vapor at successively lower pressures and temperatures, reduced from that at the discharge of the original solution from said plural stages of flash evaporation and condensation, to vaporize an additional part of the water from the original solution and to obtain additional fresh water vapor in the respective second series of plural stages for flash evaporation and absorption;

(b) directing the said additional fresh water vapor formed in the respective second series of plural flash evaporation and absorption stages to the respective absorption zones of these stages;

(c) withdrawing from said generator a relatively concentrated solution in water of hydrophilic material having a relatively lower vapor pressure of water than that of said additional fresh water vapor in the respective absorption zones;

(d) passing the said concentrated solution of hydrophilic material through the respective absorbing zones in counterflow relationship to the flow of the original aqueous solution passing through the second series of stages, the said relatively concentrated solution of hydrophilic material being maintained at temperatures below its boiling points at the pressures prevailing in the respective absorbing zones;

(e) directly contacting in the respective absorbing zones the additional fresh water vapor with the relatively concentrated solution of hydrophilic material to absorb the additional water vapor and to form a combined stream of a relatively more dilute solution of hydrophilic material; and (f) removing the combined stream of relatively dilute solution of hydrophilic material from the last absorption zone, which is at the highest temperature, and passing it to the said generator.

References Cited by the Examiner

UNITED STATES PATENTS

| 2,310,399 | 2/1943 | Cox et al. | 202—205 X |
| 2,514,944 | 7/1950 | Ferris et al. | 202—53 X |
| 2,803,589 | 8/1957 | Thomas | 203—11 |
| 3,152,053 | 10/1964 | Lynam | 202—53 X |
| 3,165,452 | 1/1965 | Williams | 202—53 |

OTHER REFERENCES

Publication: Chemical Engineering Progress (1961), vol. 57, No. 1, pages 47–51.

Vapor Reheat Flash Evaporation, by D. F. Othmer et al.

NORMAN YUDKOFF, *Primary Examiner.*

F. E. DRUMMOND, *Assistant Examiner.*